United States Patent [19]

Bradford, Jr. et al.

[11] 4,223,279
[45] Sep. 16, 1980

[54] PULSED ELECTRIC DISCHARGE LASER UTILIZING WATER DIELECTRIC BLUMLEIN TRANSMISSION LINE

[75] Inventors: Robert S. Bradford, Jr., Los Angeles; Leonard W. Braverman, Santa Monica; Jeffrey I. Levatter, San Clemente, all of Calif.

[73] Assignee: Mathematical Sciences Northwest, Inc., Bellevue, Wash.

[21] Appl. No.: 816,696

[22] Filed: Jul. 18, 1977

[51] Int. Cl.² .......................................... H01S 3/097
[52] U.S. Cl. ...................... 331/94.5 PE; 331/94.5 D; 331/94.5 G
[58] Field of Search ................. 331/94.5 G, 94.5 PE, 331/94.5 D; 361/327

[56] References Cited

U.S. PATENT DOCUMENTS

| | | | |
|---|---|---|---|
| 3,558,908 | 1/1971 | Kulikov et al. | 361/327 |
| 3,864,643 | 2/1975 | Waynant | 331/94.5 PE |
| 3,882,418 | 5/1975 | Godard et al. | 331/94.5 PE |
| 4,064,465 | 12/1977 | Hundstad et al. | 331/94.5 PE |

OTHER PUBLICATIONS

Wang, Review Sci. Instruments, vol. 47, No. 1, Jan. 1976, pp. 92–95.
Burnham et al., Applied Phys. Letters, vol. 29, No. 11, Dec. 1, 1976, pp. 707–709.
Burnham et al., App. Phys. Lett., vol. 29, No. 1, Jul. 1, 1976, pp. 30–32.

*Primary Examiner*—William D. Larkins
*Attorney, Agent, or Firm*—Graybeal & Uhlir

[57] ABSTRACT

A pulsed electric discharge gas laser driven by a folded Blumlein transmission line with liquid dielectric. A method of preionizing and firing the laser discharge utilizing the Blumlein voltage pre-pulse for preionization and the subsequent main voltage pulse for gap switch breakdown. A spark gap switch construction with first and second elongate electrodes, with the first electrode presenting a generally rounded surface to the second electrode which incorporates a thin continuous edge facing the first electrode. An elongate apertured cathode at the lasing chamber, with an elongate preionization electrode positioned behind the cathode, and a power supply providing a preionization electrical pulse across the cathode and preionization electrode producing ions and electrons in the lasing gas prior to the main discharge between the anode and cathode.

10 Claims, 7 Drawing Figures

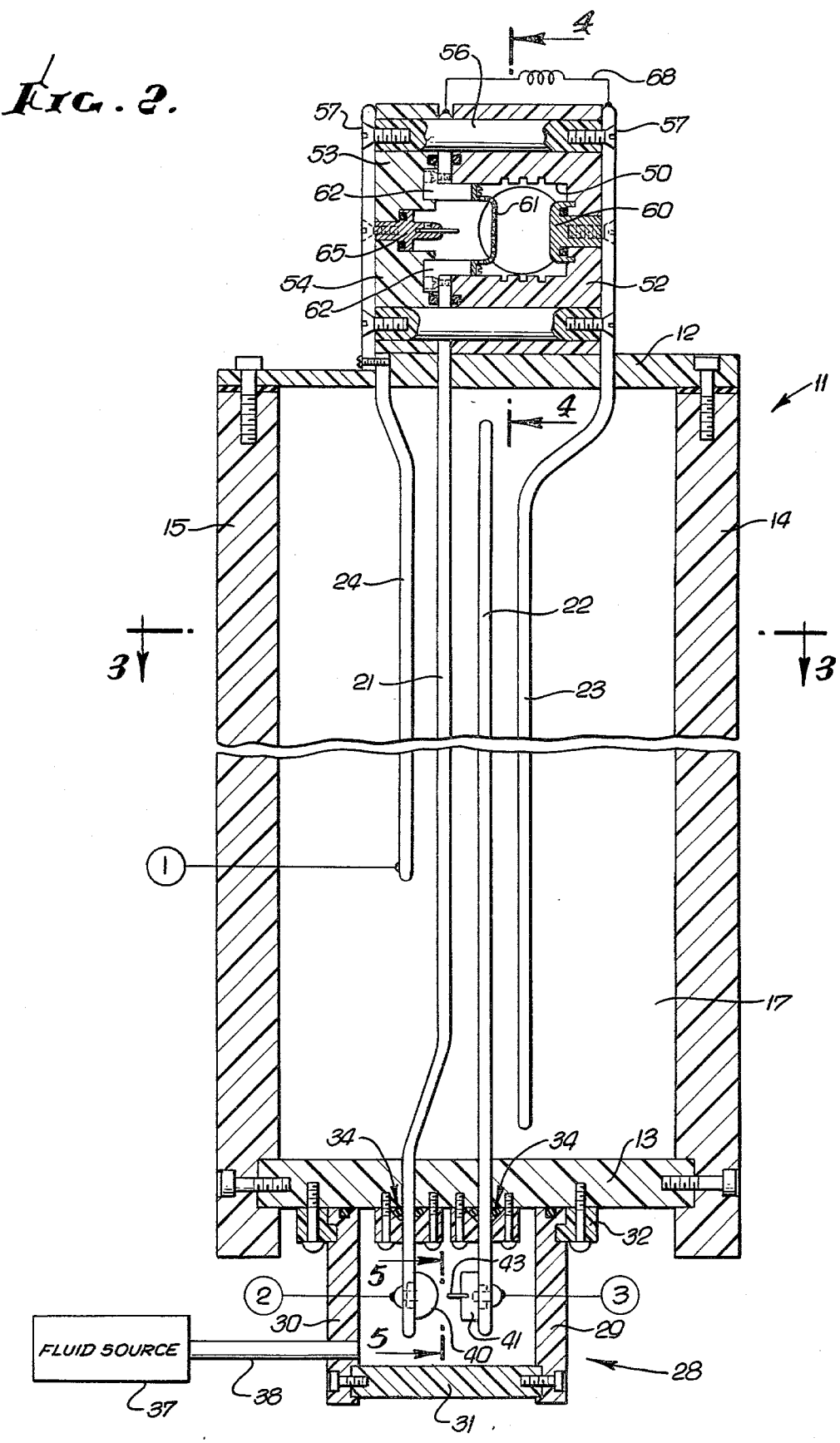

PULSED ELECTRIC DISCHARGE LASER UTILIZING WATER DIELECTRIC BLUMLEIN TRANSMISSION LINE

BACKGROUND OF THE INVENTION

This invention relates to pulsed electric discharge gas lasers and in particular, to a new and improved laser construction providing a high energy radiation source.

A wide variety of laser configurations are known and in use, and effort is continuously being made to increase output of laser sources. It is an object of the present invention to provide a new and improved laser of the gas discharge type with increased power output, with an aim of peak power in the order of 1-10 megawatts and a 25 nanosecond pulse width. A repetition rate above the order of 100 hertz and 10 watts average power is desired.

SUMMARY OF THE INVENTION

One feature of the present invention is the use of a liquid dielectric (typically water) folded Blumlein transmission line as the driver circuit for a fast transversely excited electric discharge laser. Another feature is the use of the characterisitic Blumlein voltage pre-pulse as a means of preionizing and thus conditioning the high pressure (~1 atm) laser discharge. A third feature is the use of a negative-edge/positive-plane rail spark gap as the means of switching the high current high voltage pulse onto the Blumlein transmission line and hence onto the laser discharge. An additional feature is the use of a second edge plane or multi-point, plain rail gap as a method of spark preionization of the laser discharge through a semi-transparent laser cathode.

For short duration high voltage impulses of less than $10^{-5}$ seconds, pure water behaves as a high quality dielectric of the type required by fast electric discharge lasers. Water being a polar molecule, possesses an exceptionally high dielectric constant ($\epsilon \sim 78$) throughout a broad frequency range (1 MHz to 1000 MHz). As a result of this high dielectric constant, water makes an exceptionally good pulsed dielectric. Typical high quality, low loss dielectrics presently used in pulsed electric lasers such as Mylar polyester, Kapton, and mica have dielectric constants of only two or three. Because the electric field energy stored in a polarizable medium is proportional to the dielectric constant, a water capacitor or transmission line is capable of storing about thirty (30) times as much energy per unit volume as these other dielectrics. As a consequence, dimensional tolerances normally required in low impedance transmission lines are greatly reduced because the separation of the conducting plates for a water capacitor is typically several millimeters to several centimeters, not fractions of a millimeter. Water also possesses a very high dielectric strength (greater than 200 kV/cm under certain conditions) which makes it ideally suited for high voltage pulsed applications. At even higher electric fields, should an electric arc occur in the water, steam forms which then recondenses back to form water, and thereby is self-healing. Conventional solid laser dielectrics once punctured by an electric arc are not reparable and so must be replaced.

For many pulsed laser systems, it is desirable to increase the electrical pulse length in order to extract more laser energy. The electric pulse length $\tau$ produced by a coaxial or parallel plate transmission line is $$\tau\text{pulse} = 2 \, l/c\sqrt{\epsilon}$$

where $l$ is the physical length of the transmission line, $c$ is the speed of light and $\epsilon$ is the dielectric constant. Therefore, a water dielectric transmission line is capable of generating an electrical pulse about five times longer than conventional dielectrics used for pulsed lasers.

Also, the dielectric loss tangent for pure water is relatively low resulting in only small transmission line energy losses. Waste heat deposited is easily removed by convecting the water and heat exchanging. This allows the potential for very high laser pulse repetition rate operation (>10 KHz).

In order to attain a uniform volume laser discharge (i.e., avoid electrical arcing) at high gas pressures, it is necessary to provide an initial concentration of ions and electrons in the laser discharge volume prior to the application of the main electrical pulse. This technique is termed "preionization". A unique approach in providing preionization is the use of the characterisitic Blumlein voltage pre-pulse, which is formed across the laser discharge electrodes during the charging cycle of the Blumlein transmission line. This fast pulse is large enough in amplitude to provide an initial distribution of electrons near the laser electrodes but is sufficiently short in time duration to prevent complete breakdown of the laser medium. The magnitude and timing of the pre-pulse are controlled by the pulse charging rate of the Blumlein transmission line and can be varied over a wide range of values to permit attainment of optimum preionization.

Another unique method for preionization is the use of a fast, high current preionizing discharge that is in close proximity to the main laser discharge. A fourth plate is placed coplanar with the ground plane of the water Blumlein line used to drive the main discharge and forms another water transmission line which provides the energy for the preionizing discharge. Using this technique, a very low inductance drive circuit is obtained. The preionizer electrode is placed behind an apertured cathode, preventing arcing to the anode and disturbance of the electric field pattern between laser cathode and anode. As a result of the preionization discharge, electrons pass through the cathode into the region between laser anode and cathode, thus conditioning the main discharge. The preionizer electrode is designed for large field enhancement in the direction of the cathode and typically consists of a high density linear array of metallic pins. Ultraviolet light is also produced by the preionizing discharge, causing the ejection of photoelectrons from the electrode surfaces which also helps to condition the laser discharge.

To achieve the optimum performance from the Blumlein transmission line pumped electrical discharge laser, such as the exicimers, the impedance of the transmission line must be quite low ($\leq 1$ ohm) and the electrical rise time of the line must be fast ($\leq 20$ nanoseconds). Conventional high current high voltage single arc channel switches have too much inductance to be useful in initiating the electrical current pulse for low impedance parallel plate transmission lines, because the electrical pulse rise time is proportional to the switch inductance divided by the line impedance. While one might be tempted to use a parallel array of single channel spark gaps in order to reduce the total switching inductance, the resulting synchronization problems may make the desired effect nearly impossible to realize. To remove the synchronization problems, a single multi-arc-channel spark gap is employed, wherein a negative-edge/positive-plane gas or liquid filled rail spark gap is used as the means of switching the high current voltage pulse onto the Blumlein transmission line and hence across the actual laser discharge. The two main advantages of the multi-arc-channel spark gap are: (a) lower inductance than a single arc channel spark gap and thus a faster risetime which is necessary for the operation of the low impedance Blumlein; and (b) the electrode erosion is considerably less than a single arc channel spark gap and consequently the multi-channel gap has a much longer lifetime. The voltage at which the gap switches is controlled by the pressure of the fill gas and the negative-edge/positive-plane separation.

BRIEF DESCRIPTION OF THE DRAWINGS

FIG. 2 is an enlarged vertical sectional view taken along the line 2—2 of FIG. 1;

DESCRIPTION OF THE PREFERRED EMBODIMENTS

Figure 1:
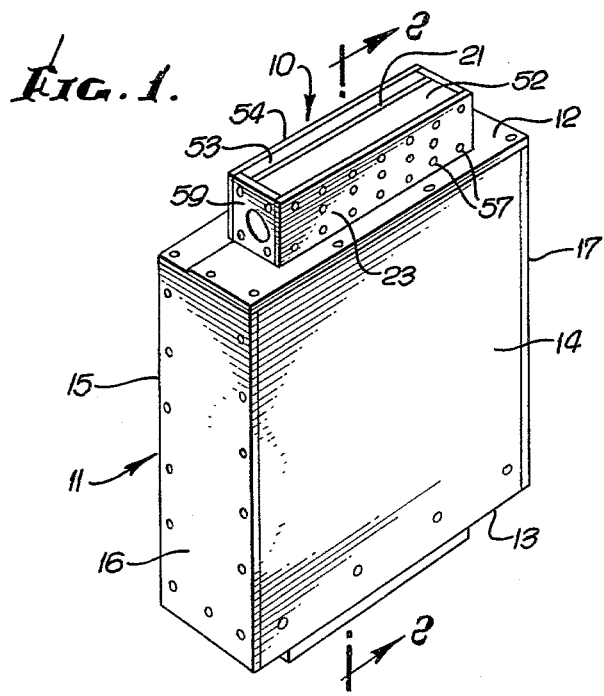
FIG. 1 is a perspective view of a gas discharge laser incorporating the presently preferred embodiment of the invention.
Figure 6:
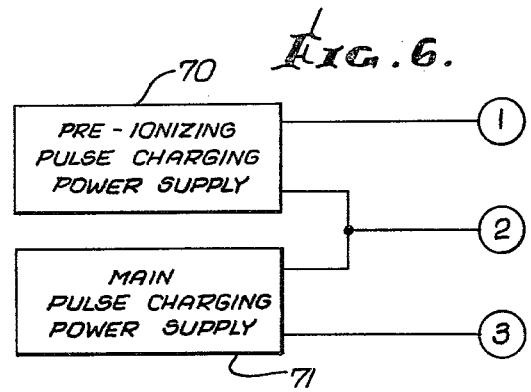
FIG. 6 is an electrical diagram illustrating power supply connections for the laser of FIG. 1.
Figure 7:
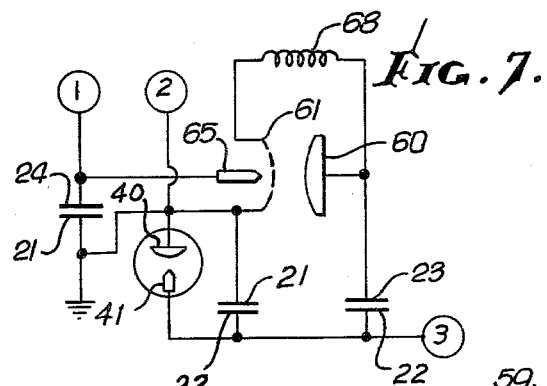
FIG. 7 is an equivalent electrical circuit of the laser of FIGS. 1–5.
Figure 4:
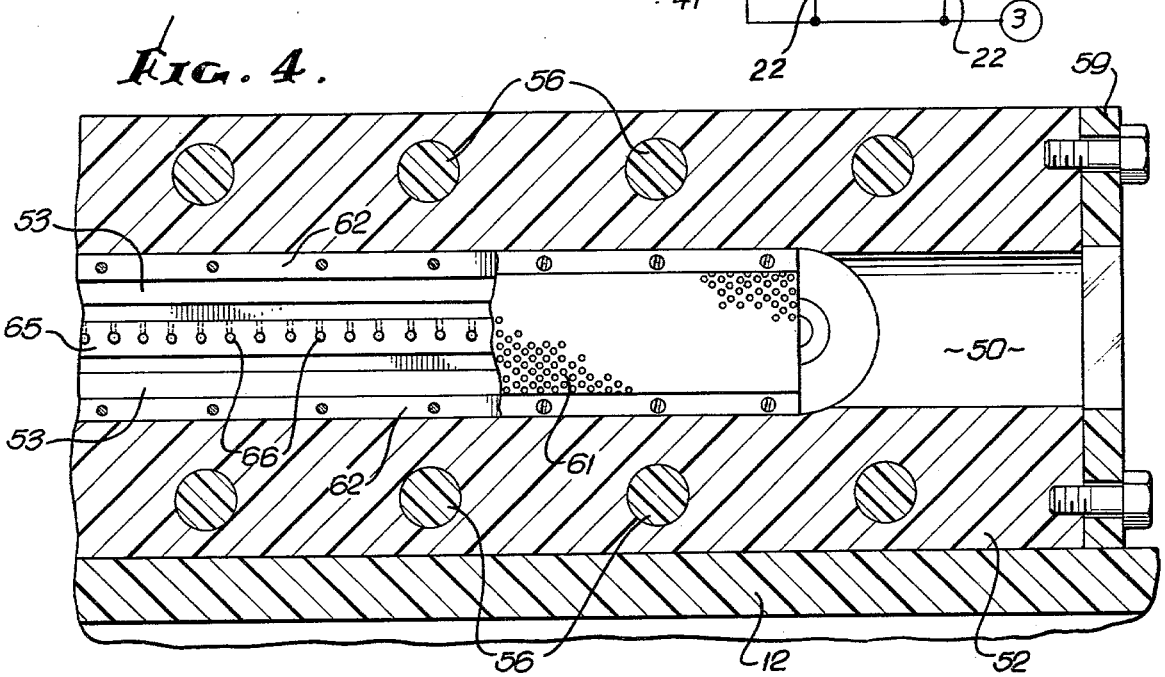
FIG. 4 is an enlarged partial sectional view taken along the line 4—4 of FIG. 2.
Figure 3:
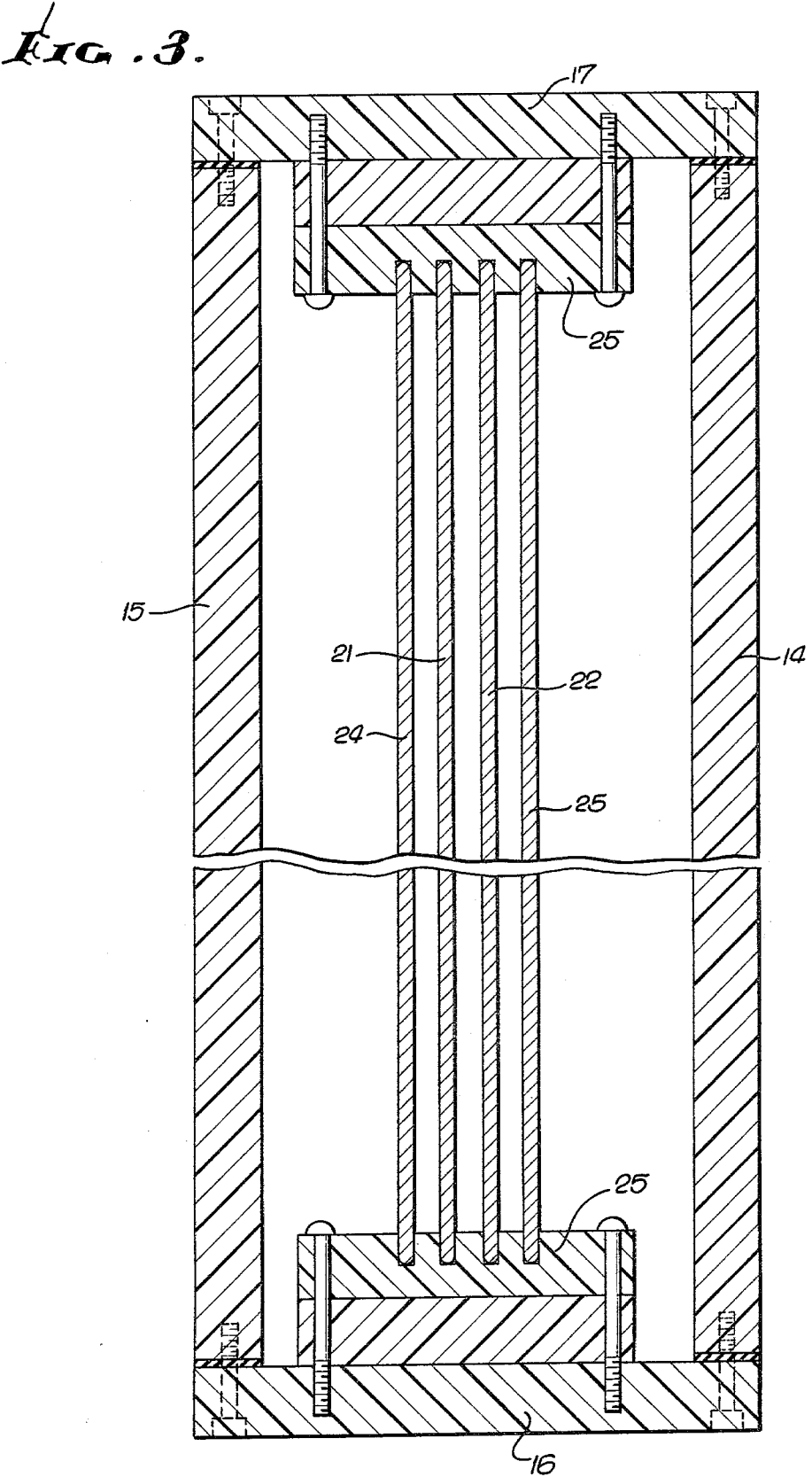
FIG. 3 is a horizontal sectional view taken along the line 3—3 of FIG. 2.

The laser of FIG. 1 includes a lasing section 10 mounted on a fluid container 11. The container has a top 12, bottom 13, sides 14, 15 and ends 16, 17 appropriately fastened together with seals to provide a fluid type enclosure for a dielectric such as water. Metal plates 21, 22, 23, 24 (FIGS. 2 and 3) are positioned within the container 11 between support blocks 25 attached to the container ends 16, 17 by appropriate bolts. The plates 21, 22, 23 are disposed in parallel spaced relation and comprise a folded Blumlein transmission line. The plate 24 is disposed in parallel spaced relation with the plate 21 and is connected to the preionization electrode to be described.

Plates 21 and 22 project through the container bottom 13 into an auxiliary container 28 having sides 29, 30, bottom 31, and ends (not shown), with the sides and ends attached to the bottom by screws and with the auxiliary container 28 attached to the container bottom 13 by appropriate bolts and brackets 32. Seals 34 are provided about the plates 21, 22 for the purpose of preventing fluid flow between the two containers.

A spark gap switch for initiating the main discharge of the laser is positioned within the auxiliary container 28. A fluid source 37 is connected to the interior of the container 28 through line 38 for providing a supply of fluid at a controlled and variable pressure. An elongate electrode 40 is mounted on the lower end of the plate 21, preferably extending the entire width of the plate. Another elongate electrode 41 is mounted on the lower end of the plate 22, also preferably extending the entire width of the plate. The electrode 40 preferably is continuous, with a rounded surface, as shown in FIG. 2.

Figure 5:
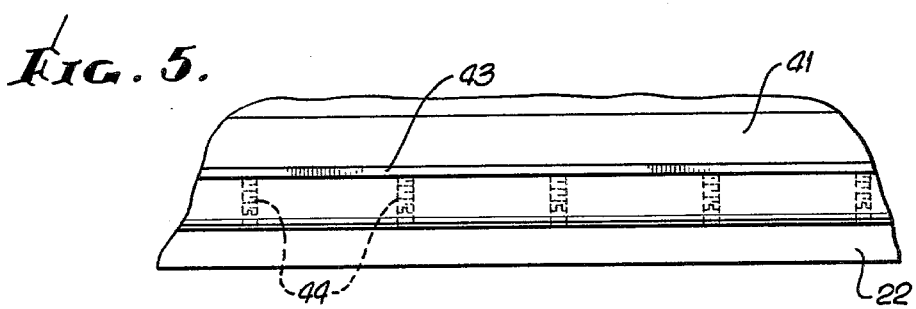
FIG. 5 is an enlarged partial sectional view taken along the line 5—5 of FIG. 2.

Electrode 41 preferably has a continuous thin edge or rail projecting outward toward the electrode 40, and a preferred construction is shown in FIG. 5. A metal strip 43 is positioned in a groove in the electrode 41 and is held in place by set screws 44.

The lasing section 10 includes a lasing chamber 50 provided in a block 52 which is assembled with the upper end of plate 23, the upper end of plate 21, another block 53, and a plate 54. This assembly is held together by dielectric rods 56 and screws 57. The plate 54 is attached to the upper end of the plate 24, with the plates 24, 21 and 23 projecting through the top 12 of the container 11. The ends of the lasing chamber are closed by end plates 59 which carry an appropriate mirror or window.

An elongate anode 60 is mounted in the block 52 along one side of the lasing chamber and is connected to the upper end of the plate 23. An elongate cathode 61 is mounted on the opposite side of the lasing chamber, on brackets 62 which in turn are attached to the plate 21. In one preferred embodiment, the cathode has an apertured configuration, such as being formed of a screen of a perforated metal sheet. An elongate preionization electrode 65 is mounted in the block 53 and connected to the plate 54, with the electrode extending along the block behind the cathode 61. Preferably, a plurality of pointed pins 66 is mounted in the electrode 65, being held in place by set screws, with the row of pins projecting toward the cathode. An inductance 68 is connected between the plate 21 and the plate 23, electrically across the gap between the cathode and anode.

A preionizing pulse charging power supply 70 is connected across plates 24 and 21 as indicated at terminals 1 and 2. A main pulse charging power supply 71 is connected across plates 21 and 22, as indicated at terminals 2 and 3. The two power supplies produce output pulses at a predetermined and preferably variable repetition rate, and one or both include means for varying the delay between the pulse from the supply 70 and the pulse from the supply 71. Also typically, both power supplies include controls for varying the pulse peak, pulse width and pulse wave form. The power supply 71 includes means for varying the rate of charge of the transmission line to which the supply is connected. Power supplies having these characteristics are conventional and hence details are not given herein.

In operation, the container 11 is filled with a liquid dielectric, preferably water. The container 28 is filled with a dielectric fluid, such as nitrogen. The plates in the container function as a folded Blumlein transmission line for coupling energy from the power supplies to the cathode and anode.

In one mode of operation, a preionizing pulse from the power supply 70 is connected between the electrode 65 and cathode 61 for producing ions and electrons in the gas between the electrode and cathode, with some of these ions and electrons moving through the apertured cathode into the gap between the cathode and anode. Then the main pulse from power supply 71 is connected across the plates 21, 22 for charging the capacitance of the transmission line. When the voltage at the spark gap between electrodes 40, 41 exceeds the breakdown voltage, there is conduction across the gap which subsequently results in a discharge between the anode and cathode in the conventional manner for the electric discharge laser.

In alternative mode of operation, the preionizing power supply 70, the preionizing electrode 65 and the plate 24 may be omitted. When the main pulse charging power supply provides an output pulse to the Blumlein transmission line, two pulses result, the first being referred to as the pre-pulse and the second being referred to as the main pulse. In previous lasers utilizing Blumlein transmission lines, attempts are made to minimize or eliminate the pre-pulse by appropriately varying the rate of charge into the line. In the present invention, the converse is chosen and the pre-pulse is empahsized and utilized to achieve the desired preionization in the gas between the cathode and anode. The output from the power supply 71 is varied such that the pre-pulse is of a magnitude sufficient to produce ionization in the gap between the cathode and anode, while being of sufficiently short duration and amplitude as to not produce complete breakdown of the anode-cathode space. The following or main pulse is of greater amplitude and produces the desired spark gap breakdown and firing of the main discharge. In some situations both types of preionization may be utilized at the same time. That is, the preionization electrode 65, plate 24 and power supply 70 can be used with the apertured cathode for perionization in the space between the electrode and cathode, along with the main power supply 71 and the Blumlein pre-pulse for preionization in the space between the cathode and anode.

As indicated earlier, the dielectric properties of water are known and water has been used as a dielectric, but the use of the water dielectric in the Blumlein transmission line for delivering energy to a laser permits operation at considerably higher energies then previously achieved with lasers.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. In a pulsed electric discharge gas laser having an elongate gas lasing chamber with elongate spaced cathode and anode along opposite sides of the chamber, the improvement comprising in combination:
   a container of liquid dielectric;
   first, second, and third metal plates positioned in said container of liquid dielectric in a parallel spaced apart relationship with other, with said second plate between said first and third plates, whereby said plates in conjunction with said liquid dielectric form a flat plate folded Blumlein transmission line and wherein said first and third plates project through a wall of said container;
   means for connecting said first plate to said cathode and said third plate to said anode;
   a low inductance gas switch connected between said second plate and one of said first and third plates for switching a high current voltage pulse onto said flat plate folded Blumlein transmission line;
   an inductance connected between said first and third plates; and
   means for connecting an external pulse power supply to said second plate and one of said first and third plates.

2. In a pulsed electric discharge gas laser having an elongate gas lasing chamber with elongate spaced cathode and anode along opposite sides of the chamber, the improvement comprising in combination:
   a container of liquid dielectric;
   first, second, and third metal plates positioned in said container in a spaced relationship from each other with said second plate parallel to and opposite said first and third plates and wherein said first and third plates project through a wall of said container;
   means for connecting said first plate to said elongate cathode and said third plate to said elongate anode;
   an inductance connected between said first and third plates;
   means for connecting an external pulse power supply to said second plate and one of said first and third plates;
   a spark gap switch connected between said second plate and one of said first and third plates wherein said spark gap switch includes first and second continuous elongate electrodes substantially uniformly spaced from each other along the gap, with one of said electrodes having a thin edge facing the other of said electrodes.

3. A laser as defined in claim 2 including a fluid charged enclosure for said electrodes, and
   means for varying the fluid pressure in said enclosure.

4. A laser as defined in claim 2 wherein said second plate and said one of said first and third plates project through a wall of said container into a fluid charged enclosure, with said electrodes carried on said projecting plates within said enclosure.

5. A laser as defined in claim 4 wherein said first and third plates project through an opposite wall of said container.

6. A laser as defined in claim 1 including:
   a second chamber separated from said lasing chamber by said cathode;
   an elongate preionization electrode positioned in said second chamber spaced from said cathode, with said cathode having a plurality of openings therethrough for communication between said lasing and second chambers; and
   means for connecting a second external pulse power supply to said cathode and preionization electrode.

7. A laser as defined in claim 6 wherein said preionization electrode comprises an elongate bar with a plurality of pins projecting from said bar towards said cathode.

8. In a pulsed electric discharge gas laser having an elongate gas lasing chamber with elongate spaced cathode and anode along opposite sides of the chamber, the improvement comprising in combination:
   a container of liquid dielectric;
   first, second, third, and fourth metal plates positioned in said container in a parallel spaced relationship from each other, with said second plate opposite said first and third plates;
   means for connecting said first plate to said cathode and said third plate to said anode;
   an inductance connected between said first and third plates;
   means for connecting an external pulse power supply to said second plate and one of said first and third plates;
   a second chamber separated from said lasing chamber by said cathode;
   an elongate preionization electrode positioned in said second chamber spaced from said cathode with said cathode having a plurality of openings therethrough for communication between said lasing and second chambers;

means connecting said fourth metal plate in said container to said preionization electrode; and, means for connecting a second pulse power supply to said first and fourth plates.

9. A laser as defined in claim 6 wherein at least one of said pulse power supplies includes means for varying the timing of the output pulse thereof relative to the output pulse of the other of said pulse power supplies.

10. A laser as defined in claim 1 wherein said liquid dielectric is water.

* * * * *